United States Patent [19]

Deinzer

[11] Patent Number: 4,505,019
[45] Date of Patent: Mar. 19, 1985

[54] METHOD OF FORMING CONSTRUCTION PANEL

[76] Inventor: Dietrich F. Deinzer, Caixa Postal 55, 09900 Diadema-S.P., Brazil

[21] Appl. No.: 471,494

[22] Filed: Mar. 2, 1983

[51] Int. Cl.³ .............................................. B23P 11/00
[52] U.S. Cl. ........................................ 29/432; 29/460; 29/155 R; 52/309.11; 52/309.12; 52/410; 228/120; 228/182
[58] Field of Search .................. 29/432, 460, 155 R; 228/182, 120; 52/309.12, 309.14, 309.16, 309.17, 309.4, 309.1, 309.11, 410

[56] References Cited

U.S. PATENT DOCUMENTS

| | | | |
|---|---|---|---|
| 1,779,949 | 10/1930 | Raynor | 52/410 |
| 1,824,091 | 9/1931 | Magee | 52/410 X |
| 1,878,180 | 9/1932 | Raynor | 52/410 |
| 2,653,469 | 9/1953 | Callan | 52/410 X |
| 3,298,152 | 1/1967 | Lockshaw | 52/309.11 X |
| 3,305,991 | 2/1967 | Weismann | 52/309.11 |
| 3,750,355 | 8/1973 | Blum | 52/309.12 |
| 3,879,908 | 4/1975 | Weismann | 52/410 X |
| 4,079,560 | 3/1978 | Weismann | 52/309.12 X |
| 4,104,842 | 8/1978 | Rockstead | 52/309.12 |
| 4,125,981 | 11/1978 | MacLeod et al. | 52/309.12 |

FOREIGN PATENT DOCUMENTS 2023215  12/1979  United Kingdom ............. 52/309.12

*Primary Examiner*—Charlie T. Moon
*Attorney, Agent, or Firm*—Leonard Bloom

[57] ABSTRACT

A method and associated device for forming reinforced panels including providing a first panel of insulation having two major surfaces, piercing the insulation panel with rod like members so that portions of the rod members extend out from both major surfaces, superimposing on each major surface a grid formed from a plurality of longitudinally and latitudinally extending bar members which are formed by attaching the bar like members at intersections thereof and orienting the grid and additionally the rod like members so that some of the rod like members contact different bar like members which are thereafter welded to form a reinforced panel.

8 Claims, 8 Drawing Figures

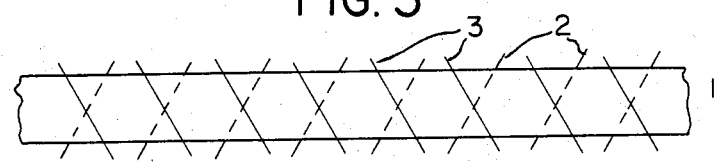
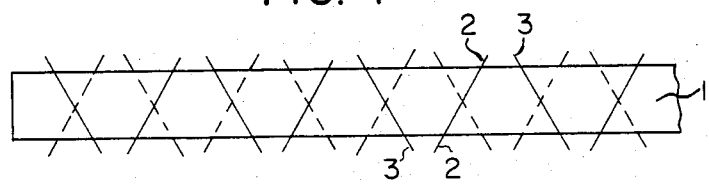
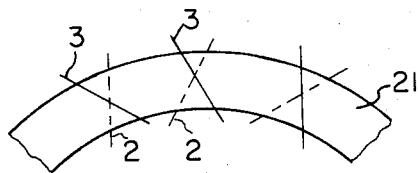
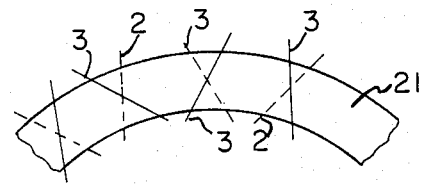
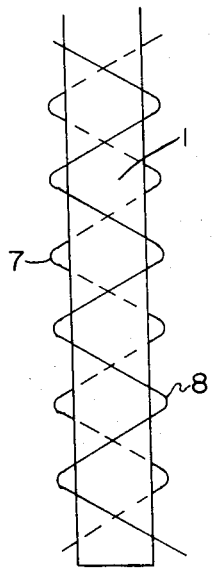
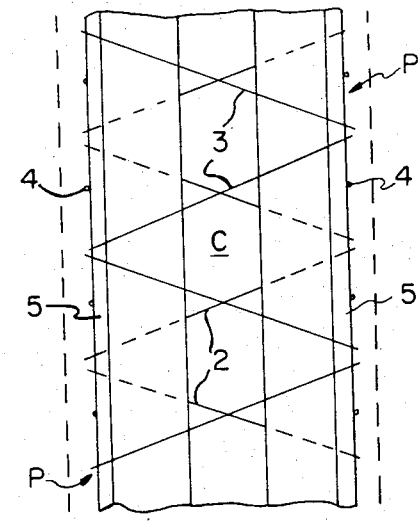

METHOD OF FORMING CONSTRUCTION PANEL

BACKGROUND OF THE INVENTION

With spiraling construction costs, it is of greater importance now than ever to provide techniques, articles, and methodology which will decrease the cost intrinsic with new construction. Heretofore, foam insulation primarily formed from rigid urethanes or the like have found its place in the construction art due to the intrinsic ability of the urethane foam's insulation and mechanical strength. Its uses have even migrated into other fields such as the automotive arts, in which the structural rigidity of the foam is enhanced by the provision of wire meshes, grids, and struts which are operatively interconnected so as to assume a portion of the load dissipation required by the panel. Additionally, coating of natural or synthetic materials of epoxy, fiberglass, or other materials disposed on the outer surfaces of the composite defined by the urethane foam core and the wire lattice enhance the structural capabilities of the panel while still providing lightweight construction techniques.

In the known prior art techniques for forming these panels that include wire or rod reinforcement, great difficulty has been perceived in the past in forming the requisite wire lattice and holding the same in place while the foam is poured into a mold in physical proximity to the lattice so that when the foam has been set, an integral unit has been provided.

While the inherent characteristics of utilizing foam has made it productive to apply the foam to the lattice after the lattice has been assembled, considerable difficulty has been experienced in maintaining the lattice in the appropriate orientation prior to and during the foam disposition process. Elaborate jigs and constraining devices are required to hold the lattice in its proper orientation, and these jigs and associated work holders interfere with the cavity defining the mold as can be readily understood.

The following citations are reflective of the state of the art and the associated problems therewith of which applicant is aware, to the extent that these citations appear to be germane to the process as hand:

U.S. Pat. Nos. 3,305,991 (Weismann); 4,104,842 (Rockstead et al.); 3,298,152 (Lockshaw); 4,125,981 (MacLeod et al.); 4,079,560 (Weismann); 4,241,555 (Dickens et al.); Article from Modern Plastics International, April 1979.

The patent to Weisman, U.S. Pat. No. 3,305,991 teaches the use of a method to produce modular structural panels. Liquid foam components are introduced into a prefabricated wire lattice as touched upon hereinabove. The foam such as polyurethane is disposed within a supporting wire grid or matrix, the foam thereafter being heated to provide an integral panel.

Likewise, Weismann U.S. Pat. No. 4,079,560 relates to a manufacturing of building panels consisting of a wire framework and a foam core similar to the process delineated immediately supra. As before, the latticework exists initially and must be supported prior to the disposition of the foam therewithin.

Likewise, Dickens et al. is of interest since they teach the use of a composite panel structure and method of manufacture in which the panel has an expanded plastic core with thin reinforcing strips bonded to front and back surfaces of the core at least along the edges thereof, and may have a wire grid attached in off set relation to one surface thereof for receiving a material such as concrete. Initially, the panel is manufactured by expanding a plastic material in a mold by the application of heat to form a core, removing the core from the mold, placing thin reinforcing strips on back and front surfaces of the core with an adhesive system between strips and the core, and returning the core to the mold and heating the interior of the mold to bond the strips to the core and achieve dimensional stability. It should be clear, that this citation refers only to panels having only wire grids and no wire lattice structure as will be made manifest in the ensuing discription of the preferred embodiment.

Likewise, Lockshaw relates to structural panel members with a high strength to weight ratio. These members are used to reinforce concrete and have no relationship to composite panels. Moreover, the method to produce them is dissimilar from the process at hand.

Rockstead et al. relates to a reinforced concrete building wall structure which enables the construction of walls having a completely open dead air space. See for example FIG. 5 reference numeral 43.

The "Modern Plastic International" article provides a basic background showing the environment within which the instant application and associated products is intended to be used. As pointed out therein, the building panels consisting of foam slabs are enclosed in a wire framework, which panels are assembled at the building site and thereafter finished with concrete or plaster. However, the methodology associated with forming the panels at the factory suffers from the maladies noted hereinabove.

The remaining citation shows the state of the art further.

By way of contrast, the instant invention is distinguished over the known prior art in that a foam core has been provided initially through which a plurality of rod like members are adapted to traverse. Subsequently, a grid defined by longitudinally and latitudinally extending bar members interconnected at the intersection are placed on opposed major surfaces of the foam core so that portions of the rods come in tangential registry with portions of the grid. Suitable affixion of the rods to the grid thereafter form a lattice without the difficulties associated with forming a lattice initially, holding same in a jig, and thereafter forming a foam core therewithin.

SUMMARY AND OBJECTS OF THE INVENTION

Accordingly, this invention has as an objective the provision of panels adapted to be used in construction which are expeditiously made when contrasted over the prior art.

It is yet a further object of this invention to provide a device of the character described above and a method of making same wherein a core member suitably formed from foam or the like has provided therethrough plural rod members adapted to operatively coact with grid instrumentalities disposed on opposed major surfaces of the foam core for subsequent affixion with a reduced cost in time, labor and machinery.

It is yet a further object of this invention to provide a device of the character described above in which plural sets of the above thus formed panels are placed in spaced parallel registry thereby defining an intermediate area adapted to receive therewithin cementitious material, or alternatively to define a dead air space.

It is still yet a further object of this invention to provide a device as characterized above in which the exterior major surfaces of the assembled foam core serve as a purchase are for subsequent parging as with cementitious material, plaster, or the like.

A further object of this invention is to provide a device as characterized above which is extremely durable in constructions and exhibits improved strength characteristics over know prior art devices.

A still further object of this invention is to provide a device as characterized above which is easily transportable from the site of fabrication to the area of installation, whereby the exposed exterior of the composite panel is protected by the thus formed latticework.

These and other objects will be made manifest when considering the following detailed specification when taken in conjunction with the appended drawing figures wherein there has been provided at least one foam core having rod members obliquely disposed therethrough, terminal portions of the rod members adapted to tangentially engage grids defined by longitudinal and latitudinally extending members, the rods and bars associated with the grids defining a lattice when suitably attached so that in preferred forms, panels of an conceivable shape can be thereby produced whether as compound contours or substantially planar. It is also evident that plural spaced pairs of said panels can be interrelated by common rod members extending between associated panels to provide dead air spaces to allow the disposition of cementitious material for further support or other materials as desired.

BRIEF DESCRIPTION OF THE DRAWING FIGURES

FIG. 3 is an end view along 3—3 of FIG. 1 with the upper and lower grid members deleted for clarity.

FIG. 4 is a similar view showing an alternative arrangement of the rods which are adapted to extend through the core prior to the disposition of the grid thereon.

FIG. 5 shows and end view alternative of that which is shown in FIG. 2 with the upper and lower grids deleted showing the disposition of the rods in one preferred form.

FIG. 6 is a view similar to that of FIG. 5 shown as an end view of FIG. 2 with the upper and lower grid members deleted for greater clarity.

FIG. 7 shows an alternative rod structure associated with the foam core.

FIG. 8 teaches the use of the panels formed according to the instant invention in one conceivable environment.

BRIEF DESCRIPTION OF THE PREFERRED EMBODIMENT

Figure 1:
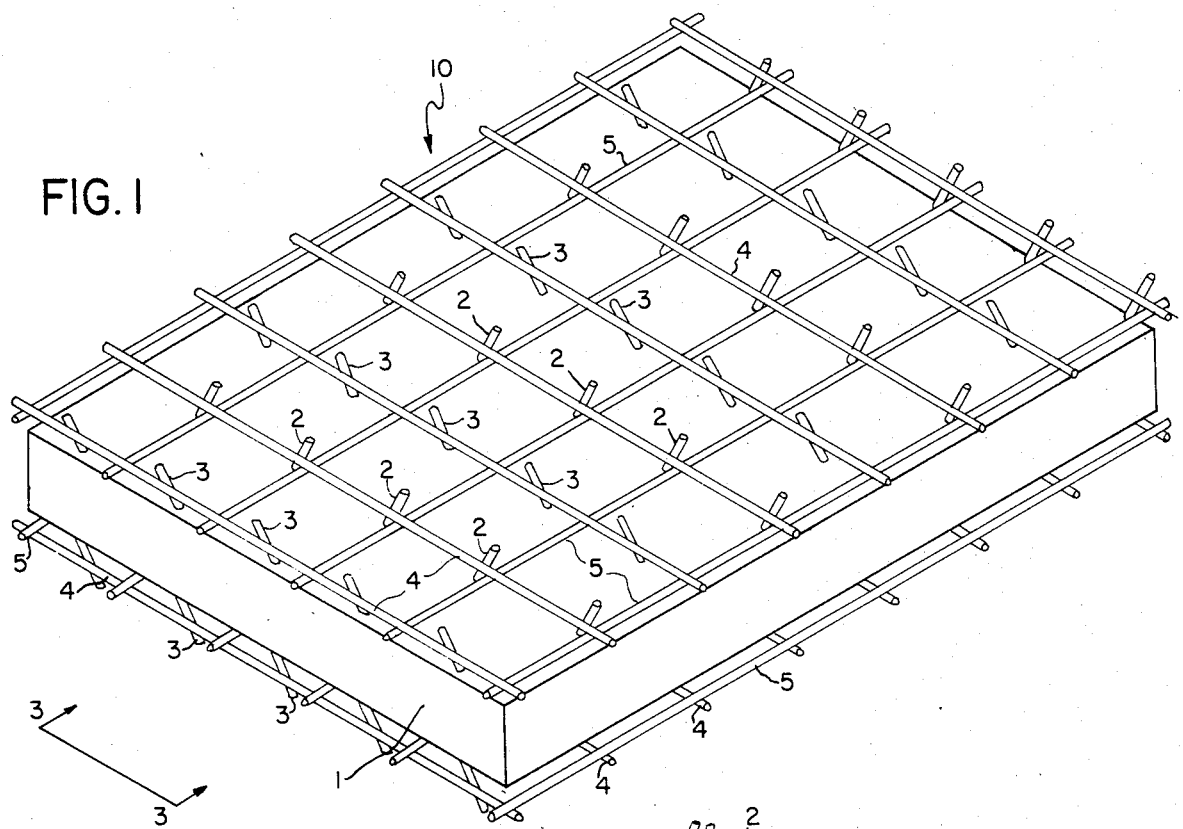
FIG. 1 is a perspective view of the product formed in accordance with the instant application delineating an inventive essence.
Figure 2:
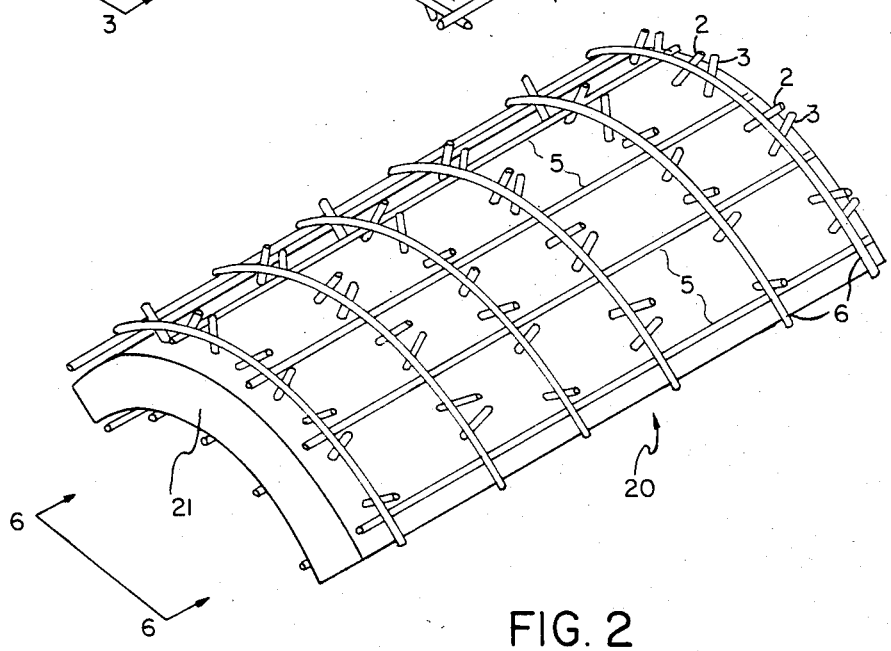
FIG. 2 is a perspective view of a second form of the invention.

Referring to the drawings now wherein like reference numerals refer to like parts throughout the various drawing figures, reference numeral 10 of FIG. 1 is directed to the reinforced panel according to one form of the invention, and reference numeral 20 of FIG. 2 is directed to a second form.

The structure of FIG. 1 defines a core of insulation substantially shaped as a panel 1 composed of any of a plurality of open or closed cell foam such as urethane, polyurethane, and its analogues. The foam slab panel 1 as shown in FIG. 1 is of substantially rectangular solid configuration and has an upper major surface and a lower major surface with a perimeter edge wall orthognally disposed to said surfaces. The panel is reinforced so as to enhance its loadbearing capabilities in a manner now to be defined.

More specifically, a plurality of rods 2, 3 are pierced or driven through the core panel 1 by any well known manner. The panel as best shown in FIGS. 3 and 4 for example delineate that the rods 2, 3 are skewed relative to a verticle plane, the first rod 2 is skewed in a clockwise direction at an angle of 15°, and the rod 3 is skewed in a counterclockwise direction at a similar angle. While this angle is seen to be beneficial, it can range from 1° to 45° as is desired for the specific building constraints for which the panel is intended to be used. Once the rods 2, 3 are skewed as shown, a grid formed from a plurality of longitudinally extending bars 5 and latitudinally extending bars 4 are placed in registry with the foam panel 1 so that the rods come in tangential registry with portions of the thus formed grid.

As shown in FIG. 1 for example, the grid defines a matrix in which the intersection of the longitudinal and latitudinal bar members are fastened together as by welding, and the rods which pierce through the panel 1 are oriented in rows with the counterclockwise skewed rod 3 disposed in one row, and the clockwise skewed rod 2 disposed in another row. Preferably, the rows of skewed rods 2, 3 are adapted to come into tangential registry with the latitudinal bars 4 as shown in FIG. 1. Once the overlying grid 4, 5 has been placed in registry on the major surfaces of the panel 1, the rods 2, 3 are affixed to the grid 4, 5 as by welding or other known prior art techniques. Thus, a lattice has been formed after the reinforcement of the rod through the panel 1 and constitutes an improvement over prior art practice since the establishment of a complex jig or work holding device has been obviated.

FIG. 4 shows an alternative embodiment to that which is shown in FIG. 1 wherein the skewed rod members 2, 3 are placed alternatively in the same row so that as shown in the drawing figures, the clockwise skewed rod 2 faces towards its counterclockwise counterpart 3 on opposite sides of the foam panel 1 alternately. FIG. 3 shows the embodiment of FIG. 1 from an end view with the grid deleted for greater clarity.

FIG. 2 teaches the use of an alternative embodiment in which the second form of panel 21 is of arcuate configuration. In this embodiment, the elemental components are the same except for the latitudinal bar element having been replaced by arcuate bars 6 having substantially the same radius of curvature as the panel 21, and concentrically disposed relative thereto on the outer face of the bars 5 which are longitudinally disposed adjacent the major outer surface of the arcuate panel.

As shown in FIG. 2, the upstanding rods 2, 3 are respectively skewed clockwise and counterclockwise so that an extension of these rods would intersect at a point, and the rods 2, 3 are adapted to be placed in tangential registry with the arcuate rods 6 as shown in the drawings. This corresponds to the configuration of FIG. 6.

FIG. 5 shows an embodiment similar to FIG. 3 which each row of rods 2, or 3, are all skewed in the same direction while FIGS. 4 and 6 show that each row has rods alternatively skewed in a single row.

FIG. 7 delineates a further embodiment in which only the rods and not the associated grid is cast integrally with the foam panel 1 or 21. In this eventuality, a serpentine rod can be used, and as shown, a first serpentine rod 8 is allowed to define one row of rods having portions extending beyond the major surfaces of the panel 1. In an alternative row, a second serpentine rod 7 is disposed, the relative rows oriented so that the serpentine rods are uniformly bent and define a zig zag. As shown in FIG. 7, the undulations associated with each zig zag rod is respectively out of phase with the preceeding row so that a uniform stress transfer mechanism can be provided with a reinforced panel as delineated hereinabove.

As a matter of fact, when viewing FIG. 1, it should be apparent that the successive rows 2, 3 are oriented so that alternate corners of the grid are successively engaged by the bars 2, 3. In FIG. 2 for example, the rods 2, 3 tend to alternate between being skewed towards each other and splayed outwardly as shown in successive rows. In this manner, greater structural integrity has been provided.

FIG. 8 teaches the use of one form of the invention in its intended environment. Like reference numerals refer to like parts but the additional features show that the rods 2, 3 are of greater length so that they are capable of extending through two foam panels disposed in substantially parallel relationship. In this case, the rods 2, 3 have sufficient length to extend between and beyond the two panels 1 and the grids that are disposed on major faces of each panel constitutes substantially the same structure as delineated hereinbefore. However, the space between the two adjacent parallel reinforced panels 1 can now have disposed therebetween a mixture of cementitious mixture or may serve to support a dead air space as is required. The outer face of the reinforced panel in this embodiment and indeed all other panels delineated hereinabove can serve as a supporting host for the disposition of plaster or other cementitious material as by parging. Clearly, the depiction of FIG. 8 would equally apply to concentric arcuate reinforced panels as delineated in the embodiment in FIG. 2, and a section would appear to embrace the same form with the reference numerals 4 being substituted with the reference numeral 6 in this specific case.

In the use and operation of the invention, the following methodology can be embraced. The foam panel 1 or 21 is formed by a conventional technology after which a plurality of the rods 2, 3 are inserted therethrough. Thereafter, a grid formed from a plurality of longitudinally extending members 5 and members disposed transverse thereto 4, 6 are affixed relative to each other as be welding and placed in tangential registy with the rods that extend outwardly. The rods and the bars are thereafter affixed to form a lattice thereby having the foam panel be reinforced. The rods 2, 3 can have sufficient length to support a second or plural panels in like manner, each panel including the grid as set forth hereinabove. Once an array of such panels is suitably oriented, the space between adjacent panels can be filled with cementitious material as by pouring or the like, and the outer external faces of the panels can be finished with a plaster or other cementitious coating to provide a finished appearance.

Having thus described the preferred embodiment of the invention, it should be understood that numerous structural modifications and adaptations may be resorted to without departing from the spirit of the invention.

What is claimed is:

1. A method for forming reinforced panels comprising the steps of:
   providing first a panel of insulation having two major surfaces,
   piercing the insulation panel with rod like members so that portions of the rod like members extend out from both major surfaces.
   superimposing on each major surface a grid formed from a plurality of longitudinally and latitudinally extending bar like members which are formed by attaching the bar like members at intersections thereof,
   orienting the grids and initially the rod like members so that some of the rod like members contact different bar like members,
   welding the bar like members to the rod like members at the point of tangency.

2. The method of claim 1 including the step of orienting the rod like members in directions relatively skewed to each other so as to provide a reinforced panel having a rod disposition through a larger area thereof.

3. The method of claim 2 including the step of forming the rod like members in rows within the panel adjacent the latitudinal bars.

4. The method of claim 3 including the step of parging the outer face of the reinforced panel thus formed.

5. The method of claim 4 including the step of providing a second panel parallel to and spaced from the first panel and providing different grids on opposed major surfaces thereof and placing the rod members from the first reinforced panel therethrough.

6. The method of claim 5 including the step of disposing a cementiteous material between the first and second reinforced panels.

7. The method of claim 6 including the step of parging the other exterior face of the second panel remote from the cementitious coating.

8. The method of claims 6 and 7 including the step of forming the panel as an arcuate segment.

* * * * *